United States Patent
Nazari

(10) Patent No.: US 6,665,747 B1
(45) Date of Patent: Dec. 16, 2003

(54) METHOD AND APPARATUS FOR INTERFACING WITH A SECONDARY STORAGE SYSTEM

(75) Inventor: Siamak Nazari, Arcadia, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 547 days.

(21) Appl. No.: 09/686,110

(22) Filed: Oct. 10, 2000

Related U.S. Application Data

(60) Provisional application No. 60/160,957, filed on Oct. 22, 1999.

(51) Int. Cl.[7] .............................................. G06F 13/00
(52) U.S. Cl. ......................... 710/22; 711/138; 711/112
(58) Field of Search ........................... 710/22; 711/138, 711/112

(56) References Cited

U.S. PATENT DOCUMENTS

| | | | | |
|---|---|---|---|---|
| 5,247,639 A | * | 9/1993 | Yamahata | 711/138 |
| 5,287,473 A | * | 2/1994 | Mohan et al. | 711/133 |
| 5,461,721 A | * | 10/1995 | Cormier et al. | 711/2 |
| 5,548,740 A | * | 8/1996 | Kiyohara | 345/543 |

FOREIGN PATENT DOCUMENTS

| | | | | |
|---|---|---|---|---|
| JP | 09073412 | * | 3/1997 | G06F/12/02 |

OTHER PUBLICATIONS

Publication, entitled "Application–Controlled Physical Memory using External Page–Cache Management," by Kieran Harty, et al., Sep. 27, 1992, No. 9, New York, pp. 187–197.

Harty, Kieran and Cheriton, David, Application–Controlled Physical Memory using External Page–Cache Management, 1992, pp. 187–197.*

* cited by examiner

*Primary Examiner*—Jeffrey Gaffin
*Assistant Examiner*—Justin Knapp
(74) *Attorney, Agent, or Firm*—Park, Vaughan & Fleming LLP

(57) ABSTRACT

One embodiment of the present invention provides a system for processing a request directed to a secondary storage system. The system operates by receiving the request at an interface of the secondary storage system. This request specifies an operation to be performed on the secondary storage system, a location within the secondary storage system to which the request is directed, and an address of a target buffer located outside of the secondary storage system for holding data involved in the request. Next, the system processes the request by transferring data between the location within the secondary storage system and the target buffer located outside of the secondary storage system. If the target buffer is located within a page cache, processing the request involves communicating with the target buffer located within the page cache. If the target buffer is located within a user space of an application, processing the request involves communicating with the target buffer located within the user space without passing through the page cache.

28 Claims, 3 Drawing Sheets

METHOD AND APPARATUS FOR INTERFACING WITH A SECONDARY STORAGE SYSTEM

RELATED APPLICATION

The application hereby claims priority under 35 U.S.C. §119 to Provisional Patent Application No. 60/160,957 filed on Oct. 22, 1999.

BACKGROUND

1. Field of the Invention

The present invention relates to accessing data on secondary storage devices within a computer system. More particularly, the present invention relates to a method and an apparatus for communicating with a secondary storage system through a single interface for both unbuffered secondary storage references and secondary storage references from a page cache.

2. Related Art

Secondary storage devices, such as disk drives, provide a cost-effective means for storing files containing program code and data, and for storing pages of virtual memory that cannot be accommodated in the main memory of a computer system.

Unfortunately, accesses to secondary storage devices can be extremely slow, potentially requiring millions of processor clock cycles to perform a single read operation or a write operation. Such long delays in accessing secondary storage can severely degrade computer system performance.

In order to reduce the effects of these long delays, computer systems typically maintain a page cache in fast random access memory to buffer accesses to secondary storage. Data that is read from secondary storage is first stored into the page cache before being read into a user address space. Data that is written to secondary storage is first stored into the page cache before being written to secondary storage. This enables a subsequent access to a page within the page cache to be satisfied without having to access secondary storage.

Some applications, such as database systems, perform their own buffer management in order to optimize performance. Hence, accesses for these types of applications typically communicate with the secondary storage system directly, without passing through the page cache.

As distributed computer systems become more ubiquitous, it is becoming increasingly common for a local computer system to access a storage device located on a remote computer system across a network. In this case, a page cache is most effective if it is located on the local computer system so that references to the page cache do not have to traverse the network. Unfortunately, existing operating systems typically combine the page cache into a mechanism that controls physical storage devices, and this combined mechanism is typically located near the storage device on the remote computer system.

What is needed is a method and an apparatus that facilitates separating a page cache from the mechanism that controls physical storage devices for a secondary storage system.

SUMMARY

One embodiment of the present invention provides a system for processing a request directed to a secondary storage system. The system operates by receiving the request at an interface of the secondary storage system. This request specifies an operation to be performed on the secondary storage system, a location within the secondary storage system to which the request is directed, and an address of a target buffer located outside of the secondary storage system for holding data involved in the request. Next, the system processes the request by transferring data between the location within the secondary storage system and the target buffer located outside of the secondary storage system. If the target buffer is located within a page cache, processing the request involves communicating with the target buffer located within the page cache. If the target buffer is located within a user space of an application, processing the request involves communicating with the target buffer located within the user space without passing through the page cache.

In one embodiment of the present invention, the operation specified by the request can include a read operation to read data from the location specified within the secondary storage system into the target buffer. The operation can also include a write operation to write data from the target buffer into the location specified within the secondary storage system.

In one embodiment of the present invention, if the target buffer is located within a kernel space of the operating system, processing the request involves communicating with the target buffer located within the kernel space without passing through the page cache. In a variation on this embodiment, if the target buffer within the kernel space is referenced through a virtual address that refers to a direct memory access (DMA) device located on a remote computer system, processing the request involves communicating data between the secondary storage system and the DMA device on the remote computer system without having to buffer the data at an intermediate point between the secondary storage system and the DMA device.

In one embodiment of the present invention, processing the request can involve dividing the request into a plurality of smaller requests to be processed by at least one storage device within the secondary storage system.

In one embodiment of the present invention, processing the request can involve allowing the request to proceed asynchronously, while an application that originated the request continues executing without waiting for the request to complete. In a variation on this embodiment, if the request proceeds asynchronously, the system additionally notifies the application when the request completes.

In one embodiment of the present invention, processing the request involves translating the location within the secondary storage system specified by the request from a logical block address into a physical block address.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
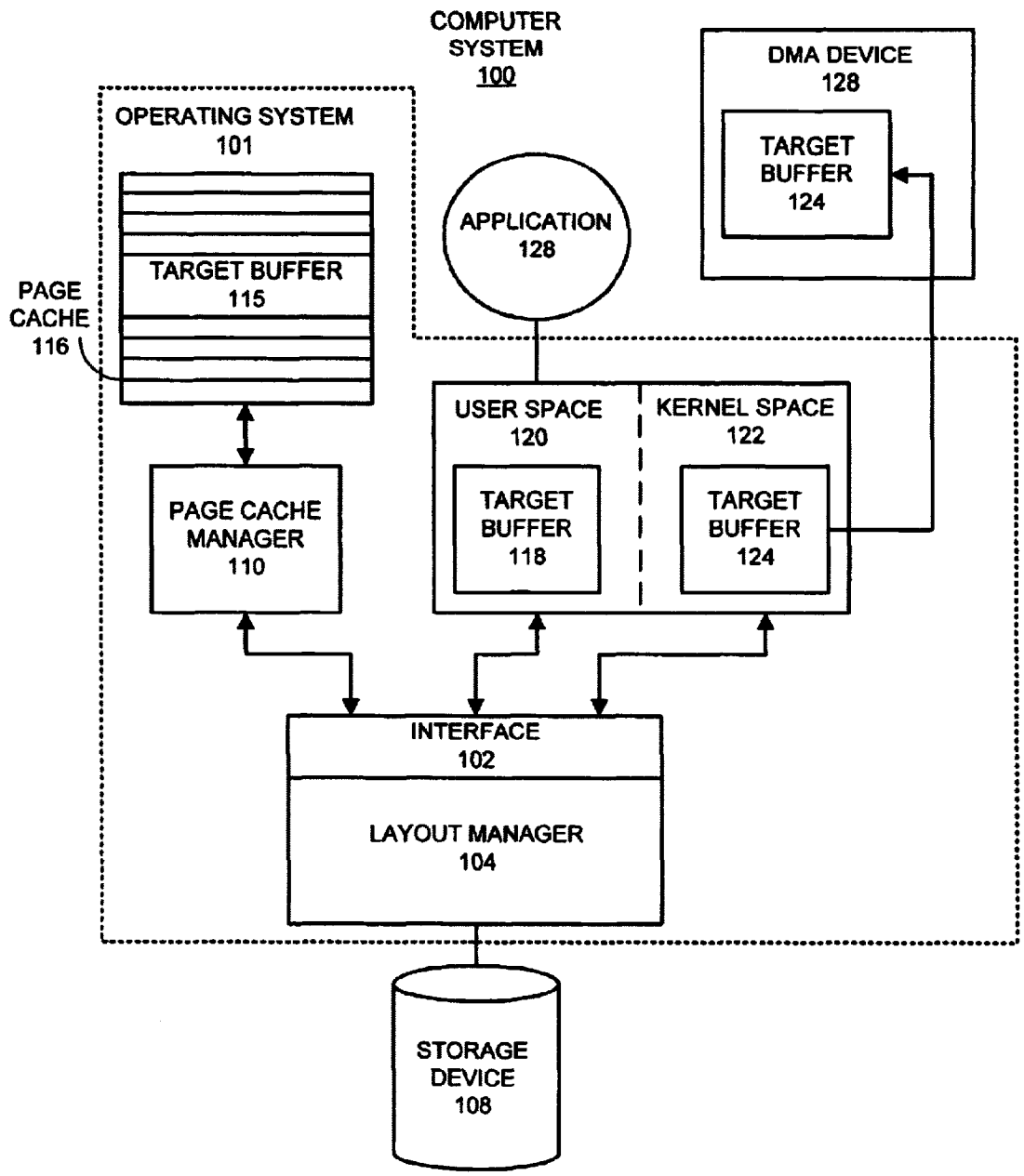
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. (Note that although only software components of computer system 100 are illustrated, hardware structures, such as a processor and a memory are also present within computer system 100.)

Computer system 100 includes an operating system 101 that controls and coordinates the operation of components within computer system 100. Portions of operating system 101 that are relevant to the present invention include layout manager 104, page cache 116 and page cache manager 110. Operating system 101 also manages a user space 120 for an application 128, as well as a kernel space 122.

Layout manager 104 controls the organization of data on storage device 108. Storage device 108 can include any type of non-volatile storage device that can be coupled to computer system 100. This includes, but is not limited to, magnetic, optical, and magneto-optical storage devices, as well as storage devices based on flash memory and/or battery-backed up memory. Storage device 108 may also include an array of storage devices or a network of storage devices that operate in concert to service secondary storage requests.

Layout manager 104 includes interface 102, which can service requests from a number of different sources, including requests to transfer data to or from page cache 116, user space 120 and kernel space 122.

Page cache 116 is used to buffer data that is accessed from storage device 108. Data read from storage device 108 is first placed into page cache 116 before being recorded at its ultimate destination. Data to be written to storage device 108 is first placed into page cache 116 before being written to storage device 108. This enables a subsequent access to a page located within page cache 116 to be satisfied without having to generate an access to storage device 108. Note that page cache 116 is a unified page cache that stores pages associated with virtual memory, as well as pages associated with file system references. Also note that page cache 116 operates under control of page cache manager 110.

Operating system 101 additionally controls the execution of applications, such as application 128. Application 128 executes out of user space 120 within operating system 101. During execution, application 128 can make an unbuffered secondary storage request directly to layout manager 104 through interface 102. In processing this unbuffered request, layout manager 104 interacts with target buffer 118 within user space 120.

Operating system 101 additionally maintains kernel space 122 (in which operating system 101 executes). Layout manager 104 can additionally service a request that involves a target buffer 124 within kernel space 122. In some cases, the address range of target buffer 124 is directed to physical locations on an external DMA device 127 located outside of computer system 100.

Note that computer system 100 can include a distributed computer system in which page cache 116 is located on a different computing node from layout manager 104. In this case, operating system 101 is a distributed operating system that controls the interactions of page cache 116 and layout manager 104, which are located on different computing nodes.

Breaking Down a Request

Figure 2:
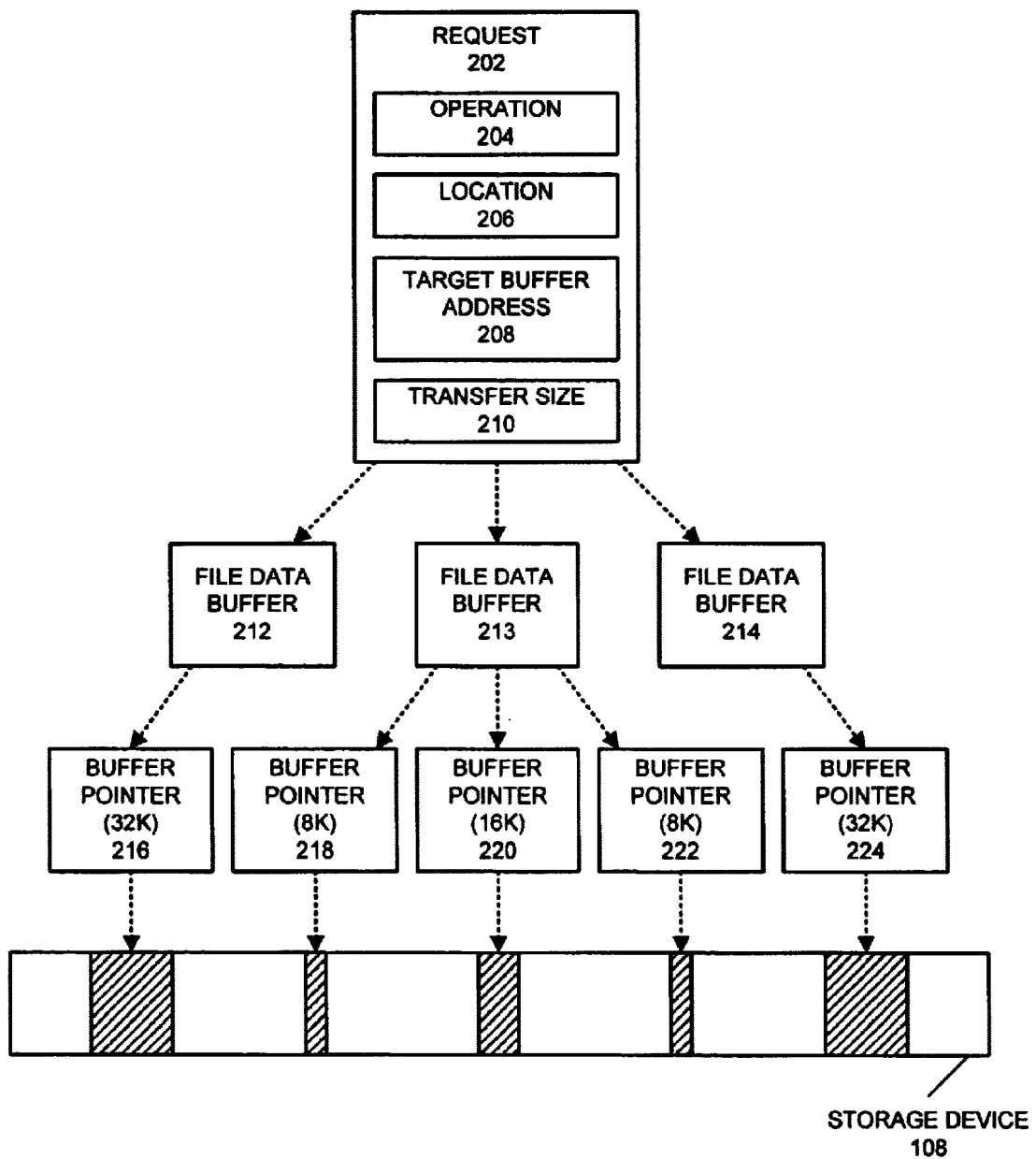
FIG. 2 illustrates how a request is broken down into sub-units in accordance with an embodiment of the present invention.

FIG. 2 illustrates how a request 202 is broken down into sub-units for processing in accordance with an embodiment of the present invention.

Request 202 includes a number of pieces of information, including a specifier for an operation 204, a specifier for a location 206, an address of a target buffer 208 and a transfer size 210.

Operation 204 can specify that the operation is a write operation from a target buffer to a location within storage device 108. It can also specify that the operation is a read operation from a location within storage device 108 to a target buffer. It can also specify whether the operation is an asynchronous operation that enables an application initiating the operation to continue processing while the operation is in progress.

Location 206 specifies a logical block number within the secondary storage system to which the request is directed. The system translates this logical block number into a physical device block number before using the physical device block number to access storage device 108.

Target buffer address 208 specifies the address of a target buffer for the request which is located outside of layout manager 104. Target buffer address 208 may point to a number of different types of target buffers, such as target buffer 115 within page cache 116, target buffer 118 within user space 120, or target buffer 124 within kernel space 122.

Transfer size 210 specifies a transfer size for the request. Note that request 202 can additionally include other pieces of information that are not specified within FIG. 2.

When request 202 is received within layout manager 104, request 202 is divided into one or more file data buffers 212–214. The number of file data buffers depends upon how many file data buffers are required to accommodate the amount of data specified by transfer size 210. File data buffers 212–214 are used internally within layout manager 104 to store data associated requests.

Layout manager 104 translates each of file data buffers 212–214 into one or more buffer pointers that get passed to storage device 108. More specifically, file data buffer 212 is translated into a 32K-byte buffer pointer 216, which is mapped to a first shaded region of storage device 108. File data buffer 213 is translated into an 8K-byte buffer pointer 218, a 16K-byte buffer pointer 220 and an 8K-byte buffer pointer 222, which are mapped to a second, a third and a fourth shaded region of storage device 108, respectively. Note that file data buffer 213 is divided into multiple buffer pointers 218, 220 and 220 in order to fit into existing unused regions within storage device 108. Finally, file data buffer 214 is translated into a 32K-byte buffer pointer 224, which is mapped to a fifth shaded region of storage device 108.

Processing a Request

Figure 3:
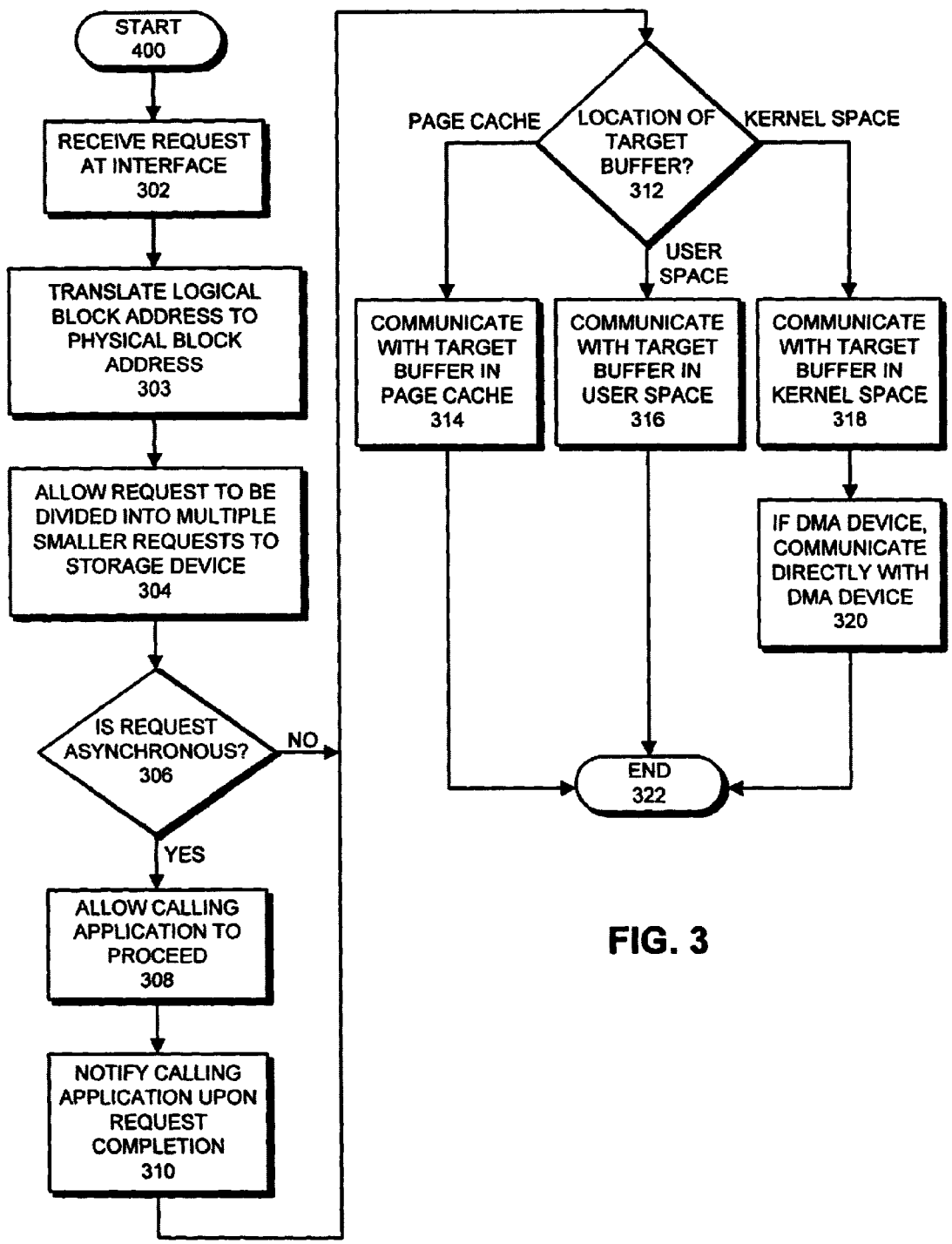
FIG. 3 is a flow chart illustrating the processing of a request directed to a secondary storage system in accordance with an embodiment of the present invention.

FIG. 3 is a flow chart illustrating the processing of a request 202 directed to a secondary storage system in accordance with an embodiment of the present invention. The system starts by receiving request 202 at interface 102 of layout manager 104 (see FIGS. 1–2) (step 302).

The system translates the logical block address 206 within the request, which specifies a logical location within the secondary storage system, into a physical block address, which specifies a physical location within storage device 108 (step 303). Note that the physical block address may itself be a logical block address for underlying storage devices, if storage device 108 is a composite storage device composed of array disks or a network of disks.

If necessary, the system allows the request to be divided into multiple smaller requests to storage device 108 (step 304). This process of dividing a request is described in more detail above with reference to FIG. 2.

If the request is asynchronous, the system allows the calling application, for example application 128 in FIG. 1, to proceed without waiting for the request to complete (step 308). When the request eventually completes, the system notifies the calling application, so that the calling application can know that the request completed (step 310).

The system takes a number of actions depending upon the location of the target buffer specified by target buffer address 208.

If the target buffer is located within page cache 116, the system communicates with page cache 116 in order to satisfy the request (step 314). For a read operation, data is moved from storage device 108 into at least one file data buffer with layout manager 104, and then into a target buffer 115 within page cache 116. For a write operation, data is moved from the target buffer 115 within page cache 116 into at least one file data buffer with layout manager 104, and then into a specified location within storage device 108.

If the target buffer is located within user space 120 of application 128, the system similarly communicates with user space 120 in order to satisfy the request (step 318).

If the target buffer is located within kernel space 122 of operating system 101, the system similarly communicates with kernel space 122 in order to satisfy the request (step 320). If the address range of the target buffer 124 within kernel space 122 is actually directed to an external DMA device 127 located outside of computer system 100, the system communicates directly with DMA device 127 without having to copy the data to an intermediate location (step 322).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for processing a request directed to a secondary storage system, comprising:
   receiving the request at an interface of the secondary storage system; and
   processing the request by transferring data between a location within the secondary storage system to which the request is directed and a target buffer for the request located outside of the secondary storage system;
   wherein if a target buffer is located within a user space of an application, processing the request involves communicating with the target buffer located within the user space without passing through a page cache.

2. The method of claim 1, wherein if the target buffer is located within the page cache, processing the request involves communicating with the target buffer located within the page cache.

3. The method of claim 1, wherein the request specifies:
   an operation to be performed on the secondary storage system;
   the location within the secondary storage system to which the request is directed; and
   an address of the target buffer located outside of the secondary storage system for holding data involved in the request.

4. The method of claim 1, wherein the operation specified by the request can include:
   a read operation to read data from the location specified within the secondary storage system into the target buffer; and
   a write operation to write data from the target buffer into the location specified within the secondary storage system.

5. The method of claim 1, wherein if the target buffer is located within a kernel space of the operating system, processing the request involves communicating with the target buffer located within the kernel space without passing through the page cache.

6. The method of claim 5, wherein if the target buffer within the kernel space is referenced through a virtual address that refers to a direct memory access (DMA) device located on a remote computer system, processing the request involves communicating data between the secondary storage system and the DMA device on the remote computer system without having to buffer the data at an intermediate point between the secondary storage system and the DMA device.

7. The method of claim 1, wherein processing the request can involve dividing the request into a plurality of smaller requests to be processed by at least one storage device within the secondary storage system.

8. The method of claim 1, wherein processing the request can involve allowing the request to proceed asynchronously, while an application that originated the request continues executing without waiting for the request to complete.

9. The method of claim 8, wherein if the request proceeds asynchronously, the method further comprises notifying the application when the request completes.

10. The method of claim 1, wherein processing the request involves translating the location within the secondary storage system specified by the request from a logical block address into a physical block address.

11. A computer-readable storage medium storing instructions that when executed by a computer cause the computer to perform a method for processing a request directed to a secondary storage system, the method comprising:

receiving the request at an interface of the secondary storage system; and processing the request by transferring data between a location within the secondary storage system to which the request is directed and a target buffer for the request located outside of the secondary storage system;

wherein if a target buffer is located within a user space of an application, processing the request involves communicating with the target buffer located within the user space without passing through a page cache.

12. The computer-readable storage medium of claim 11, wherein if the target buffer is located within the page cache, processing the request involves communicating with the target buffer located within the page cache.

13. The computer-readable storage medium of claim 11, wherein the request specifies:

an operation to be performed on the secondary storage system;

the location within the secondary storage system to which the request is directed; and an address of the target buffer located outside of the secondary storage system for holding data involved in the request.

14. The computer-readable storage medium of claim 11, wherein the operation specified by the request can include:

a read operation to read data from the location specified within the secondary storage system into the target buffer; and a write operation to write data from the target buffer into the location specified within the secondary storage system.

15. The computer-readable storage medium of claim 11, wherein if the target buffer is located within a kernel space of the operating system, processing the request involves communicating with the target buffer located within the kernel space without passing through the page cache.

16. The computer-readable storage medium of claim 15, wherein if the target buffer within the kernel space is referenced through a virtual address that refers to a direct memory access (DMA) device located on a remote computer system, processing the request involves communicating data between the secondary storage system and the DMA device on the remote computer system without having to buffer the data at an intermediate point between the secondary storage system and the DMA device.

17. The computer-readable storage medium of claim 11, wherein processing the request can involve dividing the request into a plurality of smaller requests to be processed by at least one storage device within the secondary storage system.

18. The computer-readable storage medium of claim 11, wherein processing the request can involve allowing the request to proceed asynchronously, while an application that originated the request continues executing without waiting for the request to complete.

19. The computer-readable storage medium of claim 18, wherein if the file system request proceeds asynchronously, the method further comprises notifying the application when the request completes.

20. The computer-readable storage medium of claim 11, wherein processing the request involves translating the location within the secondary storage system specified by the request from a logical block address into a physical block address.

21. An apparatus that facilitates processing a request directed to a secondary storage system, comprising:

an interface within the secondary storage system that is configured to receive the request directed to the secondary storage system;

a request processing mechanism within the secondary storage system that is configured to process the request by transferring data between a location within the secondary storage system to which the request is directed and a target buffer for the request located outside of the secondary storage system; and a page cache for storing pages of virtual memory, wherein the page cache is configured to make requests on the secondary storage system through the interface;

wherein the interface is additionally configured to receive a file system request from an application, wherein the file system request specifies that the target buffer is located within a user space of the application wherein if interface receives a request specifying that the target buffer is located within a kernel space of the operating system, the request processing mechanism is configured to process the request by communicating with the target buffer located within the kernel space without passing through the page cache.

22. The apparatus of claim 21, wherein the request specifies:

an operation to be performed on the secondary storage system;

the location within the secondary storage system to which the request is directed; and an address of the target buffer located outside of the secondary storage system for holding data involved in the request.

23. The apparatus of claim 21, wherein the operation specified by the request can include:

a read operation to read data from the location specified within the secondary storage system into the target buffer; and a write operation to write data from the target buffer into the location specified within the secondary storage system.

24. The apparatus of claim 21, wherein if the target buffer within the kernel space is referenced through a virtual address that refers to a direct memory access (DMA) device located on a remote computer system, the request processing mechanism is configured to process the request by communicating data between the secondary storage system and the DMA device on the remote computer system without having to buffer the data at an intermediate point between the secondary storage system and the DMA device.

25. The apparatus of claim 21, wherein the request processing mechanism is configured to process the request by dividing the request into a plurality of smaller requests to be processed by at least one storage device within the secondary storage system.

26. The apparatus of claim 21, wherein the request processing mechanism is configured to process the request by allowing the request to proceed asynchronously, while the application that originated the request continues executing without waiting for the request to complete.

27. The apparatus of claim 26, wherein if the file system request proceeds asynchronously, the request processing mechanism is configured to notify the application when the request completes.

28. The apparatus of claim 21, wherein the request processing mechanism is configured to process the request by translating the location within the secondary storage system specified by the request from a logical block address into a physical block address.

* * * * *